July 5, 1949. R. L. HASCHE 2,475,093
PROCESS FOR MULTISTAGE CONVERSION OF HYDROCARBONS
Original Filed Jan. 21, 1946
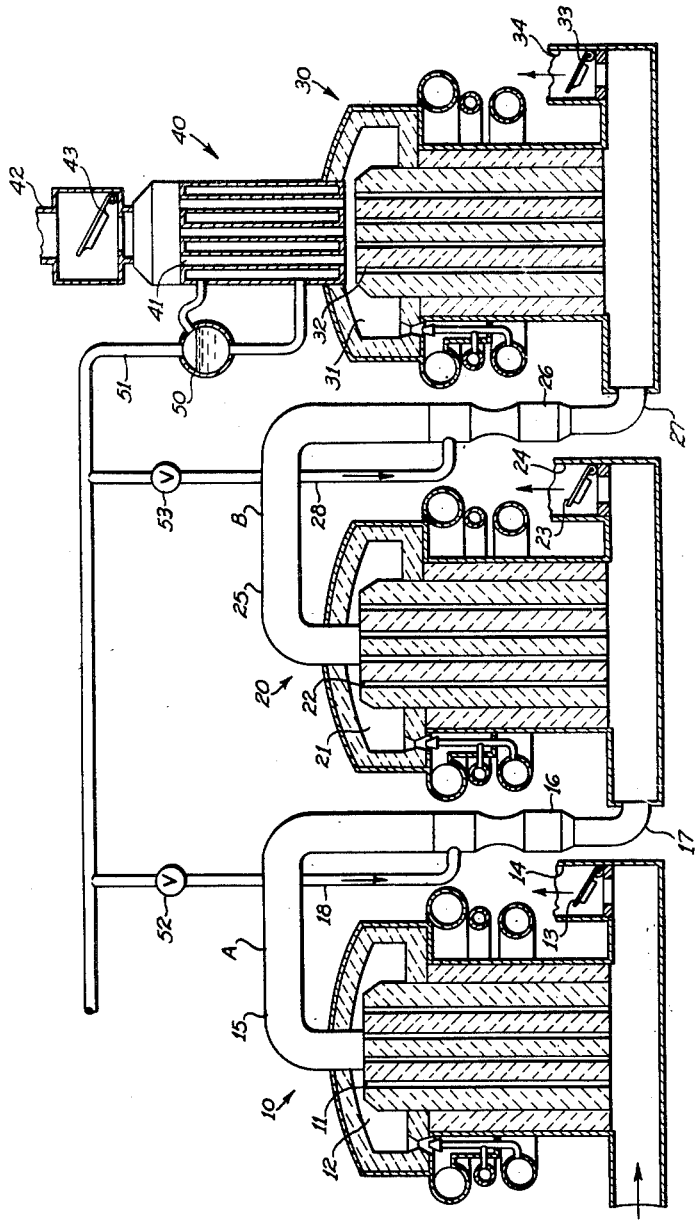
INVENTOR:
RUDOLPH LEONARD HASCHE
By His ATTORNEYS;
HARRIS, KIECH, FOSTER & HARRIS Patented July 5, 1949

2,475,093

UNITED STATES PATENT OFFICE 2,475,093

PROCESS FOR MULTISTAGE CONVERSION OF HYDROCARBONS

Rudolph Leonard Hasche, Johnson City, Tenn., assignor to Tennessee Eastman Corporation, Kingsport, Tenn., a corporation of Virginia Original application January 21, 1946, Serial No. 642,452. Divided and this application October 7, 1946, Serial No. 701,677

2 Claims. (Cl. 260—679)

This application is a division of my copending application Serial No. 642,452, filed January 21, 1946, entitled Multistage conversion of hydrocarbons.

My invention relates to regenerative furnaces. In such a furnace a regenerative mass is provided, having open passages therethrough. The mass is constructed preferably from bricks of heat-resistant material, for example, Carborundum. The mass is heated by circulating hot gases, usually products of combustion, through the passages until the mass reaches a predetermined temperature, when the flow of heating gas is shut off. The passages are then preferably purged by forcing steam or other purging agent therethrough, and the gas to be heated is forced through the passages, being heated therein to a desired reaction temperature. When the temperature of the mass falls so low that the reaction temperature cannot be readily obtained, the cycle is repeated, the total time of the entire cycle being about three minutes in furnaces known to me.

In many applications of such furnaces it is highly desirable that the total reaction time be very short, perhaps only a fraction of a second; that is, each particle of charging stock should be kept at maximum temperature for only a fraction of a second. This condition necessitates a high mass velocity for the gas and a material drop in pressure through the passages. Many heat-resistant materials would be injured by frequent changes in pressure as a result of changes in pressure of the material being treated. Large and abrupt changes in pressure tend to cause spalling or other injury to the material. It is therefore desirable that the pressure in each portion of the passages of the regenerative mass during the treating period, that is, while gas to be heated is passing therethrough, be kept as close as possible to the pressure therein during the heating period when combustion gases are passing therethrough. This can be accomplished by providing short, straight passages so that the pressure drop therein is small and small differences in pressure will impel both the gas to be heated and the combustion gases therethrough.

It is an object of my invention to provide means for reducing pressure changes in the mass and thus to prevent injury thereto.

These furnaces are commonly used in the pyrolytic decomposition of hydrocarbons in which endothermic reactions tend to produce hydrocarbons having a lower hydrogen content and higher carbon content that that of the charging stock, which, of course, occurs when methane ($CH_4$) is converted to acetylene ($C_2H_2$) or ethylene ($C_2H_4$).

In many processes in which regenerative furnaces are used, the desired reactions are facilitated by increase in temperature and decrease in pressure. Where transient products like acetylene are produced by pyrolytic decomposition from other hydrocarbons, the efficiency of the process is increased by reducing the time of reaction. The conversion of hydrocarbons to acetylene is very rapid under proper conditions of heat and pressure, but acetylene, being unstable, changes to undesirable products if it remains under these conditions of heat and pressure too long, for example, for more than one-tenth of a second.

It is a further object of my invention to gradually reduce the partial pressure and gradually increase the temperature of the gases being treated so that when the gases enter the final reaction zone, they are under temperature and pressure conditions most favorable to effect a rapid reaction, and, conversely, to maintain the gases prior to entering this zone under temperature and pressure conditions less favorable to the reaction, thus preventing the premature formation of, for example, acetylene, and its subsequent breakdown in the reaction zone.

Further objects and advantages will be manifest hereinafter from the following description and the accompanying drawing, which is a partly sectional and partly schematic elevation of a preferred apparatus by which my invention may be practiced.

The apparatus provided for a preferred form of my process comprises in general three chambers generally designated 10, 20, and 30, respectively, each containing a regenerative mass, which may, for example, be formed of Carborundum brick. The chambers may be of the form shown in my copending application Serial No. 592,102, filed May 5, 1945, and each operates on a recurring cycle consisting of a heating period of perhaps 1½ minutes, a purging period of ½ minute or less, and a flow period of perhaps 1 minute. Each chamber delivers the gas being treated successively into the next chamber, and the last chamber delivers the gas into a boiler generally designated 40.

My invention is well adapted, but not limited, to the conversion of hydrocarbons to acetylene, ethylene, or other products, from a suitable charging stock for the production of acetylene, such as natural gas or gasoline, or from refinery waste gas or other gas containing butane, propane, or other hydrocarbons lower in carbon content than acetylene. The charging stock, if a liquid, must be sufficiently heated to gasify it before entering the apparatus illustrated and described hereinafter.

The charging stock is delivered by suitable means to the first chamber 10, the regenerative mass therein being constructed to provide passages 11. During the heating period the regenerative mass is heated by combustion gases from a combustion space 12, passing downwardly through the passages 11, and escaping through a valve 13 to a stack 14. During the purging period the passages 11 are cleared of combustion products by steam or other purging agent blown therethrough. At the end of the purging period the top of the regenerative mass is at the desired temperature, the regulation of which depends upon the characteristics of the charging stock and the end-products desired.

The charging stock in the form of a gas entering the first chamber 10 is preferably at or slightly above atmospheric pressure, this pressure decreasing slightly as the gas progresses through the chamber. The temperature of the gas flowing through the pasages 11 is raised by contact with the regenerative mass. During the heating period the gases of combustion are slightly below atmospheric pressure because of the draft of the stack 14. In changing from the heating period, in which gases of combustion pass through the regenerative mass, to the treating period, during which the charging stock is heated by the mass, pressure in the chamber 10 is only slightly changed. The gas leaving the chamber 10 is at such a temperature and under such a pressure that the conversion to acetylene may be small, this conversion occurring mainly at the higher temperature and lower partial pressures to which the charging stock is to be later subjected.

Gases from the passages 11 pass upwardly through a pipe 15 to a steam injector 16 and into the second chamber 20. The steam injector 16 is fed with steam through a pipe 18 and acts to increase the pressure on the gas delivered thereto through the pipe 15. These gases mixed with steam from the injector pass through a pipe 17 into the second chamber 20 at atmospheric pressure or slightly higher, so that the average pressure on the mixture of gas and steam in the chamber 20 is about the same as the pressure in the chamber 10. Although the pressure of the mixture is quite close to atmospheric pressure, the partial pressure on the hydrocarbonaceous charging stock is reduced by dilution with steam, and the resultant reaction is that which would occur if the chamber 20 were at a pressure considerably below atmospheric pressure without dilution of the hydrocarbon. The chambers 20 and 30 operate in the same manner as the chamber 10 and on the same cycle, except that the temperature of the mixture of gas and steam is increased in its passage through the chamber 20, the pressure thereon upon leaving the chamber 20 being about equivalent to the pressure on the gas leaving the chamber 10 through the pipe 15.

The chamber 20 provides a combustion space 21, which delivers combustion gases downwardly during the heating period, gases passing through passages 22 in the regenerative mass through a valve 23 to a stack 24. Mixed gases of the once-diluted charging stock pass upwardly through the passages 22 during the treating period and leave the chamber 20 through a pipe 25, whereby they are delivered to the chamber 30 by means of a steam injector 26 fed with steam from a pipe 28, and through a pipe 27. The injector 26 slightly increases the pressure on the gas and steam mixture delivered thereto, so that this mixture is at about atmospheric pressure when it enters the chamber 30. The steam injector, however, further dilutes this mixture and further reduces the partial pressure on the hydrocarbon constituents of the mixture delivered to the chamber 30. While I call the injectors "steam injectors," it should be obvious that steam acts merely as a motive gas and that any inert gas under pressure, for example, natural gas, might be used. By "inert gas" I mean any gas which will not react with the gas being heated. Steam produced by the process is simply a convenient motive gas. The injectors have several functions: first, they serve to draw gas out of one furnace and feed it into another; second, they dilute the gas with an inert diluent, thus decreasing the partial pressure on the hydrocarbons passing through the furnaces; and, third, since the steam or other diluent is initially usually at lower temperature than the gas it impels in the injector, and the motive gas expands in the injector, it acts as a partial quencher and reduces the temperature so that the gases leaving the injector are at a lower temperature than the gases entering it.

The chamber 30 is heated during the heating period by combustion gases passing from a combustion space 31 downwardly through passages 32, thereby heating the regenerative mass, and escaping through a valve 33 to a stack 34. During the treating period the mixture of twice-diluted charging stock and its derivatives passes upwardly through the passages 32 and into a fire tube boiler generally designated 40, disposed directly above the regenerative mass and having passages 41 therein. The gases from the passages 32 pass directly into the passages 41, wherein they are cooled by water surrounding the passages 41. The mixture then passes to a pipe 42 through a valve 43.

The boiler 40 is provided with a steam drum 50 from which steam may be taken off through a steam manifold 51, as follows: through a valve 52 by the pipe 18, and through a valve 53 by the pipe 28. Valves shown and described, as well as other necessary valves not shown, are operated by a timing mechanism (not shown) in such a manner as to produce proper cyclic operation of the apparatus. For example, the operation may be so timed that each regenerative mass reaches its maximum temperature at about the same instant. The temperatures at the top of these regenerative masses at this instant may be approximately as follows: in chamber 10, 2000° F.; in chamber 20, 2500° F.; and in chamber 30, 3000° F.; the actual temperatures attained depend on the nature of the charging stock and the end-products desired.

When the apparatus of the invention is used to produce, for example, acetylene and ethylene from propane, the method of operation is substantially as follows: Propane is passed through the passages 11 in the first regenerative mass and is therein heated to about 1750° F. In the pipe 15 the volume of different gases (A) expressed as a percentage of the volume of propane supplied to the furnace is as follows:

| Gases (A): | Vols. per 100 vols. propane |
|---|---|
| Propane | 30.3 |
| Ethane | 51.0 |
| Propylene | 12.7 |
| Ethylene | 29.4 |
| Acetylene | 1.7 |
| Benzene | 1.5 |
| Hydrogen, nitrogen, oxygen | 24.6 |
| Carbon monoxide, carbon dioxide | 3.0 |

The injector adds steam to the mixture which passes through the second regenerative mass and is heated to approximately 2000° F. therein. The mixture leaving this mass through the pipe 25 will contain gases (B) in approximately the following proportions:

| Gases (B): | Vols. per 100 vols. propane |
|---|---|
| Ethane | 16.0 |
| Methane | 48.5 |
| Propylene | 8.5 |
| Ethylene | 63.0 |
| Acetylene | 21.6 |
| Benzene | 2.0 |
| Hydrogen, nitrogen, oxygen | 80.0 |
| Carbon monoxide, carbon dioxide | 2.5 |

This mixture is then passed to the regenerative mass in the final chamber 30, where it is raised to a temperature of 2300° F. or above. The mixture leaving this mass and entering the tubes of the boiler 40 will contain gases C in approximately the following proportions:

| Gases (C): | Vols. per 100 vols. propane |
|---|---|
| Hydrogen | 175.0 |
| Carbon monoxide, carbon dioxide | 28.0 |
| Methane | 57.0 |
| Benzene | 2.5 |
| Ethylene | 32.0 |
| Acetylene | 56.0 |

After leaving the pipe 42, the mixture of gases (C) is cooled, the steam is removed by condensation, and the desired gases are separated by known means. For example, benzene, ethylene, and acetylene are removed, and the remaining gases are used as fuel in heating the regenerative masses. When operated as described, these fuel gases usually supply all the heat requirements of the system.

It should be noted that the process above described is essentially a process of freeing hydrogen from gaseous mixtures. Propane ($C_3H_8$) is largely changed to acetylene ($C_2H_2$) and ethylene ($C_2H_4$), thereby freeing methane ($CH_4$) and hydrogen.

The final conversion of ethane to ethylene and ethylene to acetylene seems to occur efficiently above 2000° F. and at low partial pressures. I have also found that acetylene is quite unstable and, if allowed to remain under low pressure for more than a fraction of a second, breaks down into methane and carbon and tar. For this reason I lower the pressure as I increase the temperature, thus completing substantially the ethane-to-ethylene reaction before large amounts of acetylene are formed.

While I have shown three regenerative masses operating in series, it should be noted that two masses produce excellent results, and in small installations are quite satisfactory. However, in large installations, for example, those producing 2000 pounds or more of acetylene per hour, it is advisable, as regards both construction and efficiency, to use three or more masses.

It is understood that the process and apparatus disclosed and described are only an exemplary embodiment of my invention, other suitable means residing within the spirit of the invention and the scope of the appended claims.

I claim as my invention:

1. A cyclic process of treating an in-gas consisting of or containing a hydrocarbon which the art teaches can be converted to acetylene by heating it above a critical temperature at a pressure substantially below atmospheric pressure, which comprises: heating a first regenerative mass having primary passages extending therethrough to a temperature below said critical temperature, said heating being accomplished by passing hot products of combustion through said primary passages; heating a second regenerative mass having secondary passages extending therethrough to a temperature above said critical temperature, said heating of said second regenerative mass being accomplished by passing hot products of combustion through said secondary passages; and, after said masses have been so heated, passing the in-gas first through said primary passages and then through said secondary passages, the partial pressure on said hydrocarbon being reduced in its passage through said secondary passages below its partial pressure in said primary passages by injecting a hot inert diluent gas into the in-gas which has been heated in said primary passages, after said in-gas leaves said primary passages at a temperature lower than that of said in-gas and before it enters said secondary passages, said diluent being introduced in such a manner as to raise the total pressure of the mixture of diluent and gas as it flows through said secondary passages over the pressure of said gas as it leaves the primary passages, and thereafter repeating the steps above described.

2. A cyclic process of treating an in-gas consisting of or containing a hydrocarbon which the art teaches can be converted to acetylene by heating it above a critical temperature at a pressure substantially below atmospheric pressure, which comprises: heating a first regenerative mass having primary passages extending therethrough to a temperature below said critical temperature, said heating being accomplished by passing hot products of combustion through said primary passages; heating a second regenerative mass having secondary passages extending therethrough to a temperature above said critical temperature, said heating of said second regenerative mass being accomplished by passing hot products of combustion through said secondary passages; and, after said masses have been so heated, passing the in-gas first through said primary passages and then through said secondary passages, the partial pressure on said hydrocarbon being reduced in its passage through said secondary passages below its partial pressure in said primary passages by injecting a diluent into the in-gas after it leaves said primary passages and before it enters said secondary passages, said diluent being introduced in such a manner as to raise the total pressure of the mixture of diluent and gas as it flows through said secondary passages over the pressure of said gas as it leaves the primary passages, said diluent being, however, introduced in sufficient quantity to substantially lower the partial pressure on said hydrocarbon as it flows through said secondary passages below the partial pressure on the hydrocarbon as it flows through said primary passages, and thereafter repeating the steps above described.

RUDOLPH LEONARD HASCHE.

REFERENCES CITED

The following references are of record in the file of this patent:

UNITED STATES PATENTS

| Number | Name | Date |
| --- | --- | --- |
| 2,208,123 | Duncan | July 16, 1940 |
| 2,236,555 | Wulff | Apr. 1, 1941 |
| 2,319,679 | Hasche et al. | May 18, 1943 |
| 2,343,866 | Hincke | Mar. 14, 1944 |
| 2,377,847 | Allen et al. | June 12, 1945 |
| 2,393,333 | Milborne | Jan. 22, 1946 |